Patented Oct. 9, 1923.

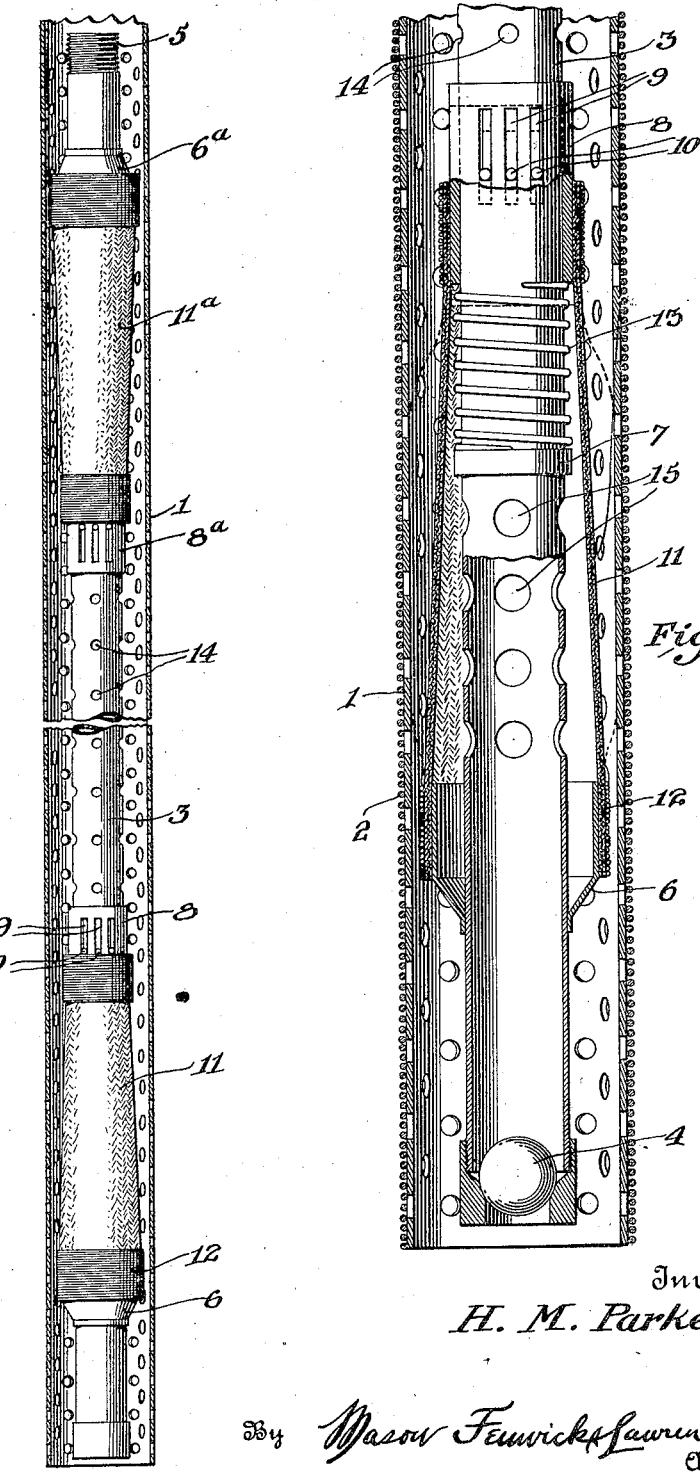

1,469,949

UNITED STATES PATENT OFFICE.

HENRY MELVIN PARKER, OF NEW ORLEANS, LOUISIANA.

WELL-SCREEN WASHER.

Application filed August 26, 1920. Serial No. 406,060.

*To all whom it may concern:*

Be it known that I, HENRY MELVIN PARKER, citizen of the United States, residing at city of New Orleans, in the parish of Orleans and State of Louisiana, have invented certain new and useful Improvements in Well-Screen Washers; and I do hereby declare the following to be a full, clear, and exact description of the invention, such as will enable others skilled in the art to which it appertains to make and use the same.

This invention relates to the art of cleaning wells and is intended and more particularly adapted for clearing the interstices of a well-screen from sediment or other solid matter after the screen has been set in the bore or well shaft in the earth.

In oil wells it is customary to set a screen in that part of the bore that penetrates the oil bearing stratum or strata. The said screen is coupled or connected to the lower end of a pipe or casing which projects downward into the bore from the surface of the ground, said screen consisting of a section of permeable pipe of suitable construction. The usual well screen comprises a length of iron or steel pipe having numerous well-distributed holes in its wall, said pipe being spirally wrapped or wound with so-called screen wire, the turns of which are slightly separated to admit the passage of oil between them, through the holes in the pipe from the exterior to the interior thereof. From the interior of the screen the oil passes upward through the pipe or casing to the surface of the ground.

The said screen is usually separated somewhat from the bore in which it is positioned. But in placing the screen it sometimes becomes clogged from contact with the earth-wall of the bore; and after use, the interstices between the turns of wire, or other interstices of the screen, are likely to become more or less clogged with sand, mud or other sediment or solid matter, so as to partly or wholly close the interstices in the screen, and materially retard or entirely prevent the flow of oil into the interior of the screen and pipe or casing.

It is the object of this invention to provide an instrumentality whereby a well screen that is so clogged with solid materials as to prevent the flow of oil through the screen interstices into the interior thereof may be thoroughly and effectively cleaned and freed from said clogging materials.

With the stated object in view the invention consists in the novel instrumentality and in the construction and arrangement of its several parts, as more particularly hereinafter described and claimed, and illustrated in the accompanying drawings.

In the drawings wherein similar reference characters designate corresponding parts in the several views:

Figure 1 is a complete elevation of the improved washer shown in position within a section of well-screen, the screen being shown in vertical section;

Figure 2 is a vertical section through a portion of well-screen and through a portion of the lower end of the washer.

In the said drawings there is illustrated a section of well-screen 1, which may be of the wire wound type, wrapped with screen wire 2. This screen section is designed to be set in the bore where the latter penetrates the oil bearing stratum, and there is usually a space between the exterior of the screen and the earthy wall of the bore. Oil flows from the oil sand or oil-bearing surrounding earth into the bore and thence through the interstices of the screen into the interior of said screen and thence upward through the pipe or casing to the surface of the ground. It is obviously essential that the interstices of the screen be kept open, and free from the sediment which, from the nature of the position and use of the screen, becomes lodged in them.

For the purpose of freeing said screen 1 from sand and other solid matter lodged in the spaces between the wires 2, or other interstices of the screen, the improved washer may be lowered to the requisite position within the screen, automatically secured to the screen, and a volume of water, oil or other suitable washing fluid may be caused to flow outward through the screen interstices for the purpose of washing the sediment from the openings of the screen.

The said washer comprises a length of pipe 3, having at its lower end (considered as standing vertically within the screen 1) a check valve 4 adapted to seat under downward pressure and to unseat under the influence of superior upward pressure. Although a ball check is shown it is obvious that a flap or any other known check valve suitable for the purpose may be used. A ball is preferable for the reason that superior pressure from below will force the ball upward through the pipe thus completely clearing the pipe of all obstructions and providing absolutely free passage for oil and gas. The upper end of the pipe 3 is provided with a means whereby it may be coupled to a length of pipe adapted to reach the surface of the ground. It is shown as threaded, for this purpose, as at 5.

At a short distance from the lower end of pipe 3 said pipe is encircled by a collar 6, which is securely and tightly fixed to the pipe. Above the collar 6 on said pipe is a rigid collar or spring abutment 7 and above the collar 7 is a slidable sleeve 8, having a limited capacity of movement longitudinally of the pipe 2. In the illustrated embodiment of the invention there are slots 9 in the sleeve and studs 10 formed on the pipe, engaging said slots, for the purpose of limiting the extent of movement, although other suitable means for accomplishing that end may be adopted if desired. The collar 6, is, as illustrated, of considerably greater external diameter than the sleeve 8—nearly as great as the internal diameter of screen 1. Secured over the exterior of the collar 6 and sleeve 8 is a flexible, tubular, fluid tight member, 11, of frusto-conical configuration, the larger end being seized by cord or wire 12, or otherwise suitably secured to the collar 6, and the smaller end being similarly secured to the sleeve 8. A coiled compression spring 13 exerts its elastic force between the fixed collar or spring abutment 7 and the lower end of the slidable sleeve 8, thus tending to keep the sleeve 8 pressed upward to the limit permitted by the studs 8 engaged in the slots 9, and tending to keep the flexible tubular member 11 extended.

At the upper end of pipe section 3, spaced away from the threads 5, is a fixed collar 6ª, a slidable collar 8ª and a flexible tubular fluid-tight connecting member 11ª, held stretched longitudinally by a spring, precisely like and corresponding with the described parts 6, 8 and 11, and their accessories, at the lower end of the pipe 3, except that the said upper and lower members are oppositely or reversely positioned with respect to each other, the smaller ends of the tapering members 11 and 11ª being directed toward each other.

The flexible members 11 and 11ª form, it will be seen, fluid tight annular chambers around the pipe 3 which may be filled from said pipe through the openings 15.

The pipe section 3 is provided with perforations 14 between the two sleeves 8 and 8ª and, at each end, within the tubular flexible members 11 and 11ª, with perforations 15 that are considerably larger than the perforations 14. Below the collar 6 and above the collar 6ª the wall of pipe 3 is imperforate. The hollow flexible members 11 and 11ª have the functions of automatic internal grapples and packers when washing fluid is forced into the pipe 3, as will be presently described.

When the improved washer described has been lowered to position within the screen pipe 1, the threaded end 5 being coupled with a pipe that extends to the surface of the ground, water, oil or any fluid available and suitable for the purpose may be pumped or otherwise forced into the pipe 3 from above. Check valve 4 seating under pressure from above prevents the escape of fluid from the lower end of the pipe. Fluid therefore accumulates therein, passes first outward through the large orifices 15 within the flexible tube 11 and expands it into fluid-tight contact with the inner surface of the screen pipe 1. Continuing accumulation of washing fluid then emerges laterally through the holes 14 in pipe 3 and flows outward against the screen tending to wash any sediment lodged in the interstices outward into the bore of the well. The washing fluid, as it is continuously forced into the pipe 2, filling it and the screen 1 up to the member 11ª, also flows through the larger orifices to the interior of flexible member 11ª which, also, expands into fluid-tight contact with the inner surface of screen 1. When both members 11 and 11ª are expanded into contact with the inner wall of pipe 1, the fluid that is forced into the pipe 3 is compelled to flow out through the holes 14 as members 11 and 11ª have plugged the screen above and below said orifices 14. Any pressure required to force the fluid through the interstices of the well screen may be applied, and as the fluid can escape only through the screen 1 between the members 11 and 11ª the force of the washing fluid is localized and effective. The fluid and sediment after filling the bore in the earth surrounding the screen 1 below the flexible plug 11ª rises above it and said fluid then enters the pipe 1 through the interstices and passes up to the surface of the ground between the pipe 1 or well casing and the pipe that is connected to the pipe 3.

When the washing fluid expands flexible members 11 and 11ª into contact with screen 1 the springs 13 are contracted and the sleeves 8, 8ª pulled toward collars 6, 6ª. After one portion of the screen 1 has been cleaned, fluid pressure may be cut off, the springs 13 allowed to expand, thereby releasing the grip of members 11 and 11ª from the interior surface of screen 1 and reducing said members to their normal size. The washer may be lowered without friction or chafing and the washing operation repeated on another clogged portion of the screen.

After the upper portion of the screen has been cleaned and the washing apparatus has been lowered to a position in the lower part of the screen, should it happen that a gas pocket or pool of oil is opened, releasing gas or oil under heavy gas pressure from below, the check valve, upon cessation or diminution of the pressure from above upon the washing fluid, or under the influence of pressure from below that exceeds the pressure from above, is immediately unseated. Free flow of gas and oil is then permitted upward through pipe 3 and its connected pipe to the surface of the ground. The springs 13 then collapse the flexible plugs 11 and 11ª permitting easy removal of the washer without interrupting the flow of gas or oil.

Having described my invention in such manner as to enable those skilled in the art to make and use the same, what I claim and desire to secure by Letters Patent is:

1. An instrument of the class described comprising a pipe, a hollow expansible member surrounding said pipe and forming a fluid tight annular chamber between it and said pipe, said pipe having the portion surrounded by said expansible member perforated and valve means located at the lower end of said pipe operative to close against pressure from within and to open responsive to superior pressure from without the pipe.

2. An instrument of the class described comprising a pipe, a hollow expansible member surrounding said pipe and forming a fluid tight annular chamber between it and said pipe, means for normally elastically contracting said member, said pipe having the portion surrounded by said expansible member perforated and valve means located at the lower end of said pipe operative to close against pressure from within and to open responsive to superior pressure from without the pipe.

3. In an instrument of the class described, a pipe, a hollow flexible member surrounding said pipe having one end fixedly secured to the pipe, a slidable sleeve on the pipe to which the other end of said flexible member is secured, spring members operative on said sleeve to contract the flexible member, said pipe being perforated within the flexible member and valve means located at the lower end of said pipe operative to close against pressure from within and to open responsive to superior pressure from without the pipe.

4. In an instrument of the class described, a pipe, a hollow frusto-conical flexible member surrounding said pipe and having its larger end secured to the pipe, a collar slidable on the pipe above the point of attachment of the flexible member and having the smaller end of the flexible member secured thereto, spring means operative on said collar to normally contract the flexible member, said pipe being perforated within the flexible member.

5. In an instrument of the class described, a pipe, two hollow flexible members surrounding said pipe, said members being spaced apart and having their outermost ends fixedly secured to the pipe, collars slidable on the pipe and having the inner ends of said tubular members fixedly secured thereto, spring means operative on said collars to normally force them toward each other to contract the tubular members, said pipe being provided with perforations within said tubular members and between the adjacent ends of said members.

6. In an instrument of the class described, a pipe, two hollow flexible members surrounding said pipe, said members being spaced apart and having their outermost ends fixedly secured to the pipe, collars slidable on the pipe and having the inner ends of said tubular members fixedly secured thereto, spring means operative on said collars to normally force them toward each other to contract the tubular members, said pipe being provided with perforations within said tubular members and between the adjacent ends of said members, and valve means located at the ends of said pipe operative to close against pressure from within and to open responsive to superior pressure from without the pipe.

7. In an instrument of the class described, a pipe, two hollow frusto-conical flexible members surrounding said pipe and spaced apart, the larger ends of said members being farthest apart, collars slidable on the pipe and having the smaller and adjacent ends of the flexible members each secured to one of said collars, spring means operative to draw said collars toward each other to normally contract the flexible members, said pipe being perforated within the flexible members and between the same.

8. In an instrument of the class described, a pipe, two hollow fustro-conical flexible members surrounding said pipe and spaced apart, the larger ends of said members being farthest apart, collars slidable on the pipe and having the smaller and adjacent ends of the flexible members each secured to one of said collars, spring means operative to draw said collars toward each other to normally contract the flexible members, said pipe being perforated within the flexible members and between the same, and valve means located at the bottom of the pipe operative to close against pressure from within and to open responsive to superior pressure from without the pipe.

9. In an instrument of the class described, a pipe, a slidable sleeve thereon having a longitudinal slot, a pin on the pipe engaging in the slot for limiting the sliding movement of the sleeve in opposite directions and preventing rotation thereof, a flexible tubular member having one end secured fluid tight to the slidable sleeve and the other end secured with respect to the pipe in such manner as to prevent its movement towards the slidable sleeve during expansion of the tubular member, said pipe being perforated to admit fluid pressure through it to the chamber formed by the tubular member.

10. In an instrument of the class described comprising a pipe, a flexible tubular member surrounding the pipe and having one end secured thereto by a fluid tight connection, a collar slidable on the pipe and having the other end of the tubular member secured thereto by a fluid tight joint, means for limiting the sliding movement of the collar and to prevent its rotation on the pipe, said pipe being perforated to permit fluid pressure therefrom into the chamber formed by the flexible member.

11. In an instrument of the class described comprising a pipe, a flexible tubular member surrounding the pipe and having one end secured thereto by a fluid tight connection, a collar slidable on the pipe and having the other end of the tubular member secured thereto by a fluid tight joint, means for limiting the sliding movement of the collar and to prevent its rotation on the pipe, said pipe being perforated to permit fluid pressure therefrom into the chamber formed by the flexible member, and tension means tending normally to force the collar away from the fixed end of the flexible member to collapse the latter.

In testimony whereof I affix my signature.

H. MELVIN PARKER.